United States Patent
Nakamura

(10) Patent No.: US 11,131,977 B2
(45) Date of Patent: Sep. 28, 2021

(54) DATA COLLECTION SYSTEM AND METHOD

(71) Applicant: KAWASAKI JUKOGYO KABUSHIKI KAISHA, Kobe (JP)

(72) Inventor: Kazuyuki Nakamura, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 256 days.

(21) Appl. No.: 15/303,242

(22) PCT Filed: Mar. 31, 2015

(86) PCT No.: PCT/JP2015/060091
§ 371 (c)(1),
(2) Date: Oct. 11, 2016

(87) PCT Pub. No.: WO2015/156165
PCT Pub. Date: Oct. 15, 2015

(65) Prior Publication Data
US 2017/0031338 A1 Feb. 2, 2017

(30) Foreign Application Priority Data

Apr. 8, 2014 (JP) .............................. JP2014-079280

(51) Int. Cl.
*G06F 7/00* (2006.01)
*G06F 16/00* (2019.01)
(Continued)

(52) U.S. Cl.
CPC ....... *G05B 19/048* (2013.01); *G05B 19/4063* (2013.01); *G05B 2219/24139* (2013.01);
(Continued)

(58) Field of Classification Search
None
See application file for complete search history.

(56) References Cited

U.S. PATENT DOCUMENTS

| 5,886,748 A | 3/1999 | Lee |
| 2003/0040839 A1* | 2/2003 | Sabe .................. G05B 19/4187 700/245 |

(Continued)

FOREIGN PATENT DOCUMENTS

| CN | 2280320 Y | 4/1998 |
| CN | 103294046 A | 9/2013 |

(Continued)

OTHER PUBLICATIONS

Jul. 7, 2015 International Search Report issued in International Patent Application No. PCT/JP20151060091.

(Continued)

*Primary Examiner* — Tuan A Pham
(74) *Attorney, Agent, or Firm* — Oliff PLC

(57) ABSTRACT

This system is a data collection system collecting a robot operation-related data/signal from a robot controller. The data collection system includes a data collection condition setting unit setting a collection condition of the robot operation-related data/signal from the robot controller and a data storage unit storing the robot operation-related data/signal collected from the robot controller. A shared memory inside which the data storage unit and the data collection condition setting unit are formed is formed in a substrate which can be mounted on an expansion slot of the robot controller. According to this system, a data collection function can be post-installed to an existing robot controller so as to arbitrarily select and collect various data on the robot operation.

9 Claims, 1 Drawing Sheet

(51) Int. Cl.
*G05B 19/048* (2006.01)
*G05B 19/4063* (2006.01)
(52) U.S. Cl.
CPC ............ *G05B 2219/33297* (2013.01); *G05B 2219/35291* (2013.01); *G05B 2219/40273* (2013.01); *G05B 2219/50102* (2013.01)

(56) References Cited

U.S. PATENT DOCUMENTS

| | | | |
|---|---|---|---|
| 2010/0161141 A1 | 6/2010 | Herre et al. | |
| 2012/0116582 A1* | 5/2012 | Negishi | B25J 9/161 700/245 |
| 2013/0041976 A1* | 2/2013 | Hendricks | G06Q 30/02 709/217 |
| 2013/0226346 A1* | 8/2013 | Dreslinski | B25J 9/1674 700/264 |
| 2013/0231779 A1* | 9/2013 | Purkayastha | B25J 9/1697 700/259 |
| 2014/0371977 A1* | 12/2014 | Sumi | G01M 17/007 701/31.5 |
| 2015/0205298 A1* | 7/2015 | Stoschek | B60L 50/60 701/23 |
| 2015/0266183 A1* | 9/2015 | Alifragkis | B25J 9/1692 700/254 |
| 2015/0298315 A1* | 10/2015 | Shick | G06N 3/008 700/246 |
| 2015/0352720 A1* | 12/2015 | Iizuka | B25J 9/1682 700/245 |

FOREIGN PATENT DOCUMENTS

| | | |
|---|---|---|
| DE | 102006056879 A1 | 6/2008 |
| EP | 0 573 657 B1 | 8/1997 |
| EP | 1767306 A1 | 3/2007 |
| JP | S61-216002 A | 9/1986 |
| JP | H08-65354 A | 3/1996 |
| JP | H09-214982 A | 8/1997 |
| JP | 2000-172307 A | 6/2000 |
| JP | 2004-202624 A | 7/2004 |
| JP | 2005-342858 A | 12/2005 |
| JP | 2007-288550 A | 11/2007 |
| JP | 2007-329627 A | 12/2007 |
| JP | 2009-129114 A | 6/2009 |
| JP | 2012-150758 A | 8/2012 |
| JP | 2013-170986 A | 9/2013 |
| WO | 00/033147 A1 | 6/2000 |

OTHER PUBLICATIONS

Oct. 12, 2016 International Preliminary Report on Patentability issued in International Patent Application No. PCT/JP2015/060091.
Nov. 27, 2017 Search Report issued in European Patent Application No. 15776084.4.
Jul. 31, 2019 First Examination Report in Indian Patent Application No. 201617034453.

* cited by examiner

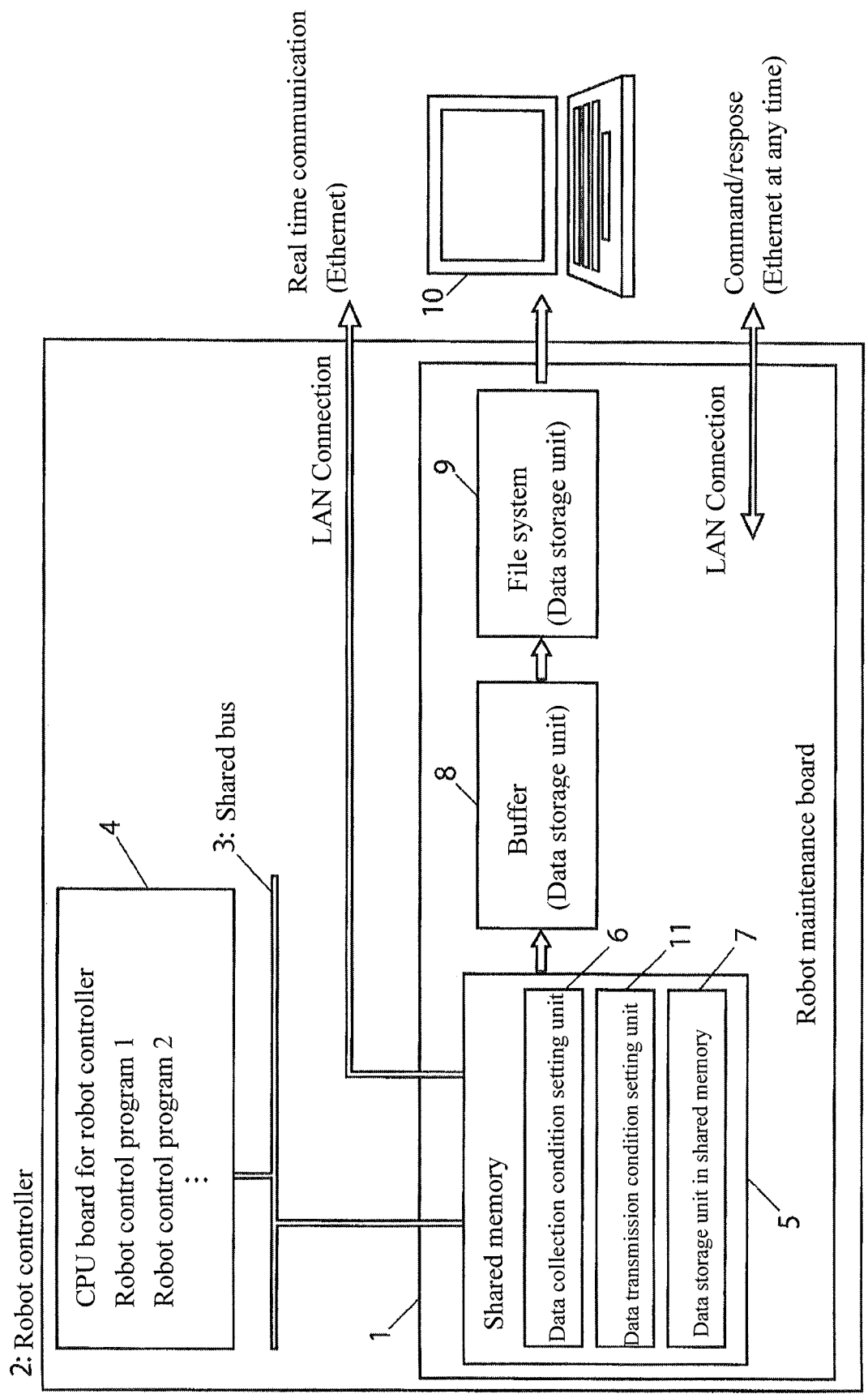

DATA COLLECTION SYSTEM AND METHOD

TECHNICAL FIELD

The present invention relates to a data collection system and a data collection method for collecting data on robot operation from a robot controller.

BACKGROUND ART

Generally, in a robot, power from a servo motor is transmitted to an arm via a drive force transmission mechanism such as a reduction gear (gear). The drive force transmission mechanism deteriorates due to long time use and abnormal events (such as interference of an arm to surrounding structures). When the drive force transmission mechanism deteriorates, there is a risk that the control accuracy of an arm decreases and the arm cannot perform desired operations.

Thus, conventionally, data on operations of a robot in motion (current value, speed, deviation, and the like) are collected in order to perform a life diagnosis and a fault diagnosis of a drive mechanism of a robot arm.

For collecting data, for example, a worker mounts a digital-analog conversion board (DA board) on a robot controller at site and so as to convert digital signals into analog signals, recording data of a robot in motion on the board.

However, sometimes this method fails to appropriately collect data necessary for performing a lifetime diagnosis and a fault diagnosis of a drive mechanism of a robot arm.

Thus, a system of implementing a WEB server or the like inside a robot controller so as to occasionally gather data of a robot via communication networks such as the intranet and the internet is also proposed (Patent Document 1).

However, in the foregoing conventional art, it is difficult to post-install a data collection function to an existing robot controller so as to arbitrarily select and collect various data on the robot operation.

CITATION LIST

Patent Literature

[Patent Literature 1] Japanese Patent Application Laid-Open No. 2004-202624

SUMMARY OF THE INVENTION

Technical Problem

The present invention is made considering the foregoing problems of the conventional technique. An object of the present invention is to provide a data collection system and a data collection method capable of post-installing a data collection function to an existing robot controller so as to arbitrarily select and collect various data on the robot operation.

Solution to Problem

In order to solve the problems above, the present invention according to a first aspect is a data collection system configured to collect a data and/or a signal on a robot operation from a robot controller, comprising a data collection condition setting unit configured to set a collection condition of the data and/or signal on the robot operation from the robot controller, and a data storage unit configured to store the data and/or signal on the robot operation collected from the robot controller, wherein a shared memory inside which the data storage unit and the data collection condition setting unit are formed is formed in a substrate which can be mounted on an expansion slot of the robot controller.

The present invention according to a second aspect is that, in the present invention according to the first aspect, the data collection condition setting unit can set a first collection condition that the data and/or signal on the robot operation is collected in a designated cycle and a second collection condition that the data and/or signal on the robot operation are collected under a specific condition on the robot operation as a trigger.

The present invention according to a third aspect is that, in the present invention according to the second aspect, the specific condition includes at least one of a trigger invalidity, a program number, a special signal, an I/O signal designation, a data unit channel number, a threshold of a data unit channel number, an error number, a pre-trigger time, and a trigger measurement finish time.

The present invention according to a fourth aspect is that, in the present invention according to any one of the first to third aspects, the data collection condition setting unit instructs to collect another data on a drive of the robot in addition to a current value, a speed, and a deviation of a servo motor driving an arm of the robot.

The present invention according to a fifth aspect is that, in the present invention according to the fourth aspect, the another date on the drive of the robot includes at least one of an intermediate arithmetic value when determining a drive condition of the robot, a program number, D/A data format, a XYZOAT, a tool tip speed, an overload arrival rate, a regeneration time over arrival rate, a number of ENC communication error, an output signal, an input signal, an internal signal, and a trigger signal.

The present invention according to a sixth aspect is that, in the present invention according to any one of the first to fifth aspects, the substrate has a network communication function configured to transmit the data and/or signal on the robot operation stored in the data storage unit to a communication network.

The present invention according to a seventh aspect further has, in the present invention according to the sixth aspect, a data transmission condition setting unit configured to set a condition when transmitting the data and/or the signal on the robot operation stored in the data storage unit to the communication network.

The present invention according to an eighth aspect is that, in the present invention according to the seventh aspect, the data transmission condition setting unit can set an off-line system transmitting the data and/or signal on the robot operation written in the shared memory to the communication network after once saving the data and/or signal on the robot operation in a non-volatile memory in the substrate and an on-line system directly transmitting the data and/or signal on the robot operation written in the shared memory to the communication network.

The present invention according to a ninth aspect is that, in the present invention according to any one of the first to eighth aspects, the data storage unit has a collected data area of the shared memory in which the data and/or signal on the robot operation collected from the robot controller is directly written, a buffer in which the data and/or signal on the robot operation is temporarily written from the collected data area, and a file system receiving a prescribed amount of the data and/or signal on the robot operation written in the buffer from the buffer and saving the same.

The present invention according to a tenth aspect is that, in the present invention according to any one of the first to ninth aspects, the data collection condition setting unit includes a program written in a collection condition data area of the shared memory using one of a plurality of robot control programs included in the robot controller.

In order to solve the problems above, the present invention according to an eleventh aspect is a data collection method configured to collect a data and/or a signal on a robot operation from a robot controller, comprising the steps of setting a data collection condition to set a collection condition of the data and/or signal on the robot operation from the robot controller, and storing a data to store the data and/or signal on the robot operation collected from the robot controller following a collection condition set in the step of setting a data collection condition, wherein a shared memory inside which a unit of performing the step of storing a data and a unit of performing the step of setting a data collection condition are formed is formed in a substrate which can be mounted on an expansion slot of the robot controller.

The present invention according to a twelfth aspect is that, in the present invention according to the eleventh aspect, the step of setting a data collection condition can set a first collection condition that the data and/or signal on the robot operation is collected in a designated cycle and a second collection condition that the data and/or signal on the robot operation is collected under a specific condition.

The present invention according to a thirteenth aspect is that, in the present invention according to the eleventh or twelfth aspect, the step of setting a data collection condition instructs to collect another data on a drive of the robot in addition to a current value, a speed, and a deviation of a servo motor driving an arm of the robot.

The present invention according to a fourteenth aspect is that, in the present invention according to any one of the eleventh to thirteenth aspects, the substrate has a network communication function configured to transmit the data and/or signal on the robot operation stored in the step of storing a data to a communication network, further comprising a step of setting a data transmission condition to set a condition when transmitting the data and/or signal on the robot operation stored in the step of storing a data to the communication network.

The present invention according to a fifteenth aspect is that, in the present invention according to any one of the eleventh to fourteenth aspects, the step of setting a data collection condition is performed by a program written in a collection condition data area of the shared memory using one of a plurality of robot control programs included in the robot controller.

Advantage

In the present invention, a data collection function can be post-installed to an existing robot controller so as to arbitrarily select and collect various data and/or signals on the robot operation.

BRIEF DESCRIPTION OF THE DRAWINGS

FIG. 1 is a block diagram schematically illustrating a data collection system according to one embodiment of the present invention.

EMBODIMENT OF THE INVENTION

Hereunder, a data collection system and a data collection method according to one embodiment of the present invention will be described referring to the drawing.

A data collection system according to this embodiment is a system configured to collect data and/or signal on the robot operation (hereunder, referred to as "robot operation-related data/signal") from a robot controller. As illustrated in FIG. 1, the data collection system 1 is configured by a robot maintenance board as one substrate.

The robot maintenance board configuring the data collection system 1 can be mounted to an expansion slot of a robot controller 2 so as to be connected to a shared bus 3 of the robot controller 2. Communication is performed between a CPU board 4 for robot controller and the robot maintenance board configuring the data collection system 1 via the shared bus 3.

A shared memory 5 is formed in the robot maintenance board configuring the data collection system 1. A collection condition data area and a collection data area are formed inside the shared memory 5. A data collection condition setting unit 6 configured to set a collection condition of the robot operation-related data/signal from the CPU board 4 for robot controller is formed in the collection condition data area of the shared memory 5. A data storage unit 7 in shared memory configured to store the robot operation-related data/signal collected from the CPU board 4 for robot controller is formed in the collection data area of the shared memory 5.

The robot maintenance board configuring the data collection system 1 further has a buffer 8 into which the robot operation-related data/signal is temporarily written from the data storage unit (collected data area) 7 in shared memory and a file system 9 receiving a prescribed amount of the robot operation-related data/signal written in the buffer 8 from the buffer 8 and storing the same. The buffer 8 and the file system 9 configure the data storage unit in this embodiment as well as the data storage unit 7 in shared memory.

Note that the file system 9 is formed of a non-volatile memory so as to prevent the robot operation related-data/signal stored therein from disappearing even in a power failure.

The robot maintenance board configuring the data collection system 1 further has a communication function for communicating with networks such as intranet and internet, and can be LAN-connected to an external PC 10 by the Ethernet (R), for example. Thereby, the robot operation-related data/signal stored in the data storage unit 7 in shared memory and the file system 9 can be transmitted to the external PC 10 or the like.

The data collection condition setting unit 6 of the data collection system 1 according to this embodiment can set a first collection condition that the robot operation-related data/signal is collected in a designated cycle and a second collection condition that the robot operation-related data/signal is collected under specific conditions related to the robot operation as a trigger.

The specific conditions mentioned above includes trigger invalidity, program number, special signal, I/O signal designation, data unit channel number, threshold of data unit channel number, error number, pretrigger time, trigger measurement finish time, and the like. When a trigger occurs under a specific condition, data may be taken in before and after the occurrence in a cycle shorter than usual. For example, when any signal is detected, data is collected for several seconds before and after the detection in a cycle shorter than usual.

Also, the data collection condition setting unit 6 can instruct to collect another data on the drive of a robot in addition to data on current value, speed, and deviation of a servo motor driving an arm of the robot. Said another date includes intermediate arithmetic value when determining the drive condition of the robot, program number, D/A data format, XYZOAT, tool tip speed, overload arrival rate, regeneration time over arrival rate, number of ENC communication error, output signal, input signal, internal signal, trigger signal, and the like.

The data collection system 1 according to this embodiment further has a data transmission condition setting unit 11 configured to set a condition when transmitting the robot operation-related data/signal stored in the data storage unit 7 in shared memory and the file system 9 to a communication network such as intranet or internet in the factory, on the line, or the like.

The data transmission condition setting unit 11 can set an off-line system transmitting the robot operation-related data/signal written in the data storage unit 7 in shared memory to the communication network after once saving the same in the file system 9 via the buffer 8 and an on-line system directly transmitting the data written in the data storage unit 7 in shared memory to the communication network.

Also, the data collection condition setting unit 6 of the data collection system 1 according to this embodiment is a program written in the collection condition data area of the shared memory 5 using one of a plurality of robot control programs included in the robot controller 2. Namely, the robot controller 2 originally has a plurality of robot control programs and one of them may be used in order to write the data collection condition setting unit 6 in the shared memory 5.

Or, the data collection condition setting unit 6 may be formed inside the shared memory 5 by an instruction from the LAN-connected external PC 10 instead of the robot control program.

Next, a method of collecting the robot operation-related data/signal using the data collection system 1 according to this embodiment will be described.

First, the above-mentioned robot maintenance board is mounted on an expansion slot of the robot controller 2.

Next, the data collection condition setting unit 6 is formed in a supply memory 5 using the robot control program or the external PC 10 (step of forming data collection condition setting unit).

Next, a collection condition of the robot operation-related data/signal from the robot controller 2 is set (step of setting data collection condition) using the data collection condition setting unit 6.

Next, the robot operation-related data/signal is collected from the CPU board 4 of the robot controller 2 and written in the shared memory following a collection condition set in the step of setting data collection condition, and then stored in the file system 9 via the buffer 8 (step of storing data).

An arbitrary and desired robot operation-related data/signal can be collected and stored from the robot in motion by these series of steps.

Note that, in the step of setting data collection condition, a first collection condition that the robot operation-related data/signal is collected in a designated cycle and a second collection condition that the robot operation-related data/signal is collected under a specific condition on the robot operation as a trigger.

Also, when transmitting the robot operation-related data/signal stored in the step of storing data to the communication network, the transmission condition is to be set previously (step of setting data transmission condition).

The robot operation-related data/signal collected by the data collection system according to this embodiment can be used for reduction gear expected life diagnosis, duty diagnosis, peak torque diagnosis, reduction gear failure prediction diagnosis, and the like. In the reduction gear expected life diagnosis, the life time of a bearing in the reduction gear is diagnosed. In the duty diagnosis, increase in load is diagnosed from a motor current mean value. In the peak torque diagnosis, change in load and teaching positions are diagnosed from change in peak current flowing through a motor. In the reduction gear failure prediction diagnosis, change in load applied to the reduction gear is diagnosed.

Also, by performing the above-mentioned various diagnosis periodically, a state of deterioration with the lapse of time can be evaluated so as to perform the tendency management diagnosis related to a state of the robot.

As discussed above, in the data collection system 1 according to this embodiment, a data collection function can be post-installed to the existing robot controller 4 so as to arbitrarily select and collect various data on the robot operation.

Also, in the data collection system 1 according to this embodiment, the robot operation-related data/signal can be collected under a specific condition as a trigger. Therefore, detailed data before and after the time when a specific condition occurs can be collected. The collected detailed data can be used for analysis of failure cause, apparatus life prediction after the occurrence of failure, and the like.

Also, in the data collection system 1 according to this embodiment, an intermediate arithmetic value when determining a drive condition of the robot can be collected. Therefore, an intermediate arithmetic value also in a complicated optimizing control can be monitored.

Also, in the data collection system 1 according to this embodiment, it is not necessary to access the CPU board 4 of the robot controller 2 from the robot maintenance board. Therefore, the robot operation is not affected when collecting data.

DESCRIPTION OF REFERENCE NUMERALS

1 . . . data collection system
2 . . . robot controller
3 . . . shared bus
4 . . . CPU board for robot controller
5 . . . shared memory
6 . . . data collection condition setting unit
7 . . . data storage unit in shared memory
8 . . . buffer
9 . . . file system
10 . . . external PC
11 . . . data transmission condition setting unit

The invention claimed is:

1. A data collection system configured to collect a data or a signal on a robot operation from a robot controller, comprising:
 a non-volatile memory;
 a shared memory having:
  a data storage configured to store the data or signal on the robot operation collected from the robot controller, the data storage having:
   a collected data area of the shared memory in which the data or signal is directly written;

a buffer in which the data or signal is temporarily written from the collected data area; and a file system receiving a prescribed amount of the data or signal written in the buffer from the buffer and saving the same;

program instructions to:

set a collection condition of the data or signal, including:

setting a first collection condition that the data or signal is collected in a designated cycle and a second collection condition that the data or signal is collected under a specific condition on the robot operation as a trigger; and collecting another data on a drive of the robot in addition to a current value, a speed, and a deviation of a servo motor driving an arm of the robot;

set an off-line system in which the data or signal in the data storage is stored in the non-volatile memory and thereafter transmitted to a communication network; and set an on-line system in which the data or signal in the data storage is directly transmitted to the communication network; and a substrate on which the non-volatile memory and shared memory are disposed, the shared memory being configured to connect to a bus of the robot controller when the substrate is mounted on an expansion slot of the robot controller.

2. The data collection system according to claim 1, wherein the specific condition includes at least one of a trigger invalidity, a program number, a special signal, an I/O signal designation, a data channel number, a threshold of a data channel number, an error number, a pre-trigger time, and a trigger measurement finish time.

3. The data collection system according to claim 1, wherein the other data on the drive of the robot includes at least one of an intermediate arithmetic value when determining a drive condition of the robot, a program number, D/A data format, a XYZOAT, a tool tip speed, an overload arrival rate, a regeneration time over arrival rate, a number of ENC communication error, an output signal, an input signal, an internal signal, and a trigger signal.

4. The data collection system according to claim 1, wherein the substrate has a network communication function configured to transmit the data or signal stored in the data storage to the communication network.

5. The data collection system according to claim 1, wherein the shared memory includes a program written in a collection condition data area of the shared memory using one of a plurality of robot control programs included in the robot controller.

6. The data collection system according to claim 1, wherein the data or signal relates to reduction gear expected life diagnosis, duty diagnosis, peak torque diagnosis, or reduction gear failure prediction diagnosis.

7. A data collection method configured to collect a data or a signal on a robot operation from a robot controller, the method comprising:

setting, inside a shared memory, a data collection condition to set a collection condition of the data or signal on the robot operation from the robot controller, including:

setting a first collection condition that the data or signal is collected in a designated cycle and a second collection condition that the data or signal is collected under a specific condition as a trigger; and collecting another data on a drive of the robot in addition to a current value, a speed, and a deviation of a servo motor driving an arm of the robot;

storing, inside the shared memory, a data to store the data or signal according to the set data collection condition;

setting an off-line system in which the data or signal stored in the shared memory is stored in a non-volatile memory and thereafter transmitted to a communication network; and setting an on-line system in which the data or signal stored in the shared memory is directly transmitted to the communication network, wherein the shared memory is formed in a substrate, the shared memory being configured to connect to a bus of the robot controller when the substrate is mounted on an expansion slot of the robot controller, and the shared memory has a data storage having:

a collected data area of the shared memory in which the data or signal is directly written;

a buffer in which the data or signal is temporarily written from the collected data area; and a file system receiving a prescribed amount of the data or signal written in the buffer from the buffer and saving the same.

8. The data collection method according to claim 7, wherein the substrate has a network communication function configured to transmit the stored data or signal to the communication network.

9. The data collection method according to claim 7, the step of setting the data collection condition is performed by a program written in a collection condition data area of the shared memory using one of a plurality of robot control programs included in the robot controller.

* * * * *